(12) United States Patent
Cepuran et al.

(10) Patent No.: US 9,367,242 B2
(45) Date of Patent: Jun. 14, 2016

(54) SYSTEMS AND METHODS FOR MANAGING INFORMATION OBJECTS IN DYNAMIC DATA STORAGE BASED UPON RELEVANCE OF THE INFORMATION OBJECTS

(75) Inventors: Brian John Cepuran, Oakville (CA); David Robert Lockhart, Waterloo (CA); Ali Ghassemi, Waterloo (CA); Dariusz Grabka, Kitchener (CA)

(73) Assignee: D2L Corporation, Kitchener, Ontario (CA)

( * ) Notice: Subject to any disclaimer, the term of this patent is extended or adjusted under 35 U.S.C. 154(b) by 174 days.

(21) Appl. No.: 13/096,171

(22) Filed: Apr. 28, 2011

(65) Prior Publication Data

US 2012/0110282 A1    May 3, 2012

Related U.S. Application Data

(60) Provisional application No. 61/330,295, filed on Apr. 30, 2010.

(51) Int. Cl.
*G06F 12/00* (2006.01)
*G06F 3/06* (2006.01)
*G06F 13/18* (2006.01)

(52) U.S. Cl.
CPC ............ *G06F 3/0605* (2013.01); *G06F 3/0649* (2013.01); *G06F 3/0685* (2013.01); *G06F 13/18* (2013.01)

(58) Field of Classification Search
CPC ................................................. G06F 17/30648
See application file for complete search history.

(56) References Cited

U.S. PATENT DOCUMENTS

| | | | | |
|---|---|---|---|---|
| 6,266,742 | B1 * | 7/2001 | Challenger et al. | 711/133 |
| 6,272,598 | B1 * | 8/2001 | Arlitt et al. | 711/133 |
| 6,415,368 | B1 * | 7/2002 | Glance et al. | 711/158 |
| 6,425,057 | B1 * | 7/2002 | Cherkasova et al. | 711/134 |
| 6,834,329 | B2 * | 12/2004 | Sasaki et al. | 711/134 |
| 6,873,982 | B1 * | 3/2005 | Bates et al. | 707/737 |
| 7,177,984 | B1 * | 2/2007 | Hervas | 711/133 |
| 7,330,933 | B2 * | 2/2008 | Crick | 711/118 |
| 7,360,042 | B2 * | 4/2008 | Chen et al. | 711/159 |
| 8,060,697 | B1 * | 11/2011 | Kneisley et al. | 711/118 |
| 2007/0136533 | A1 * | 6/2007 | Church et al. | 711/137 |
| 2007/0288586 | A1 * | 12/2007 | Wu et al. | 709/212 |
| 2008/0244201 | A1 * | 10/2008 | Heintel et al. | 711/158 |
| 2009/0089259 | A1 * | 4/2009 | Musumeci et al. | 707/3 |
| 2009/0089704 | A1 * | 4/2009 | Makela | 715/781 |
| 2009/0164602 | A1 * | 6/2009 | Kies et al. | 709/217 |
| 2010/0162126 | A1 * | 6/2010 | Donaldson et al. | 715/738 |

* cited by examiner

*Primary Examiner* — Brian Peugh
(74) *Attorney, Agent, or Firm* — Bereskin & Parr LLP

(57) ABSTRACT

According to one aspect, a system for managing information objects in dynamic data storage devices including a first data storage device having a plurality of information objects, a second data storage device operatively connectable to an output device for providing at least some of the information objects to at least one user, and at least one processor operatively coupled to the first data storage device and the second data storage device. The at least one processor is configured to automatically divide the plurality of information objects in the first data storage device to form at least one data subdivision based on division criteria, and repeatedly, in response to a dynamic operating condition determine a relevance value of at least one of the data subdivisions in the first data storage device and the second data storage device indicative of the relevance of those data subdivision to the user, and based on the relevance value, perform at least one of loading those data subdivision to the second data storage, or unloading those data subdivision from the second data storage.

26 Claims, 10 Drawing Sheets

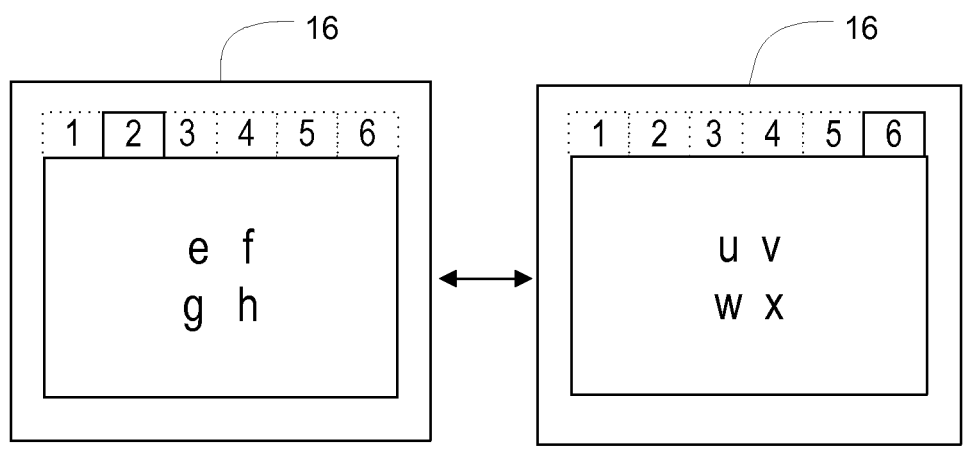
FIGURE 4A  FIGURE 4B

SYSTEMS AND METHODS FOR MANAGING INFORMATION OBJECTS IN DYNAMIC DATA STORAGE BASED UPON RELEVANCE OF THE INFORMATION OBJECTS

RELATED APPLICATIONS

This application claims the benefit of U.S. provisional patent application Ser. No. 61/330,295 filed on Apr. 30, 2010 and entitled "SYSTEMS AND METHODS FOR MANAGING INFORMATION OBJECTS IN DYNAMIC DATA STORAGE DEVICES", the entire contents of which are hereby incorporated by reference herein for all purposes.

FIELD

The embodiments herein relate to the field of memory management, and in particular to memory management for use with dynamic data storage devices.

Introduction

Computing devices, such as personal computers, laptops, netbooks, etc. normally use memory or some other storage device to store instructions for use by at least one processor to run applications and to store information objects referenced by the applications.

In most computing devices, there are different types of memories. For example, a computing device may have a persistent memory such as a magnetic hard drive or flash memory for persistent or longer-term storage of applications and information objects in the computer. A computing device may also have dynamic memory (e.g. Random-Access Memory (RAM), cache memory, etc.), which will typically store the applications and the contents relating to the processes that are currently active in the processor. Generally speaking, dynamic memory is often faster than persistent memory, but tends to be more expensive per unit of storage. Accordingly, a typical computing device will often have both faster dynamic memory and slower persistent memory.

Storing application information in the faster dynamic memory tends to result in the application having improved performance (e.g. faster loading and running). However, because there is normally a smaller finite amount of dynamic memory available on a computing device, it is often impractical to have all information associated to an application stored in the faster memory. Accordingly, some information may be stored in persistent memory, and moved into and out of the dynamic memory at various times as needed.

Some applications may require large amounts of memory to display information objects. This may be inherent to the application, as the application may attach a large overhead to each information object, regardless of the size of the information object. For example, web browser processes may assign a large amount of memory as overhead for each information object regardless of the size of the particular information object. In such cases, it may be desirable to reduce the amount of aggregate overhead by only providing information objects that the user may currently require.

Furthermore, some computing devices (e.g. mobile devices) may connect to a server over a wireless data network such as a 3G or HSPA+ networks. In such cases, the speed of transmission may be limited such that it would be undesirable to transfer a large amount of data that may or may not be used.

In some cases, the cost of data transmission may make it undesirable to transfer large amounts of data. In other cases, the size of the output device, such as a display screen in the mobile computing device, may be fairly small such that it is undesirable to load large numbers of information objects in order to improve user experience, as the display screen may only be able to display a limited number of information objects.

Accordingly, the inventors have identified a need for systems, methods, and apparatuses that attempt to address at least some of these challenges.

SUMMARY OF VARIOUS EMBODIMENTS

According to one aspect, there is provided a system for managing information objects in dynamic data storage devices comprising a first data storage device having a plurality of information objects, a second data storage device operatively connectable to an output device for providing at least some of the information objects to at least one user, and at least one processor operatively coupled to the first data storage device and the second data storage device, the at least one processor configured to: automatically divide the plurality of information objects in the first data storage device to form at least one data subdivision based on division criteria; and repeatedly, in response to a dynamic operating condition: determine a relevance value of at least one of the data subdivisions in the first data storage device and the second data storage device indicative of the relevance of those data subdivision to the user; and based on the relevance value, perform at least one of loading those data subdivision to the second data storage, or unloading those data subdivision from the second data storage.

The at least one processor may be further configured to load the at least one of the data subdivisions to the second data storage when the relevance value associated with those data subdivisions is outside a threshold.

The at least one processor may be further configured to unload the at least one of the data subdivisions from the second data storage when the relevance value associated with those data subdivisions is outside a threshold.

The at least one processor may be further configured to re-divide the plurality of information objects in response to the dynamic operating condition.

Each data subdivision may comprise at least one of a subset of the plurality of information objects, and metadata associated with at least one of the plurality of information objects.

In some embodiments, whether each data subdivision comprises metadata associated with at least one of the plurality of information objects, or whether each data subdivision comprises the plurality of information objects is based on the quantity of information objects to be displayed.

In some embodiments, the data subdivision comprises metadata, and the at least one of the plurality information objects associated with that data subdivision may be loaded to the second data storage device based on the relevance value of that subdivision.

The data subdivision may comprise metadata, and the at least one of the plurality information objects associated with that data subdivision may be unloaded from the second data storage device based on the relevance value of that data subdivision.

In some embodiments, the division criteria include a memory size value indicative of available memory size for the second data storage device.

In some embodiments, when the output device is display device, the predetermined division criteria include a display size value indicative of the size of the output display. In some embodiments, the division criteria include the size of the at least one data subdivision.

In some embodiments, the division criteria include the speed of transfer between the first data storage device and the second data device.

In some embodiments, the division criteria include preference settings, the preference settings being indicative of the user's preference as to at least one of the data subdivision of the information objects based on division criteria and determination of the relevance value.

In some embodiments, the relevance value of the at least one data subdivision is determined based on interaction frequency value indicative of the frequency of user interaction with that data subdivision.

In some embodiments, the relevance value of the at least one data subdivision is determined based on preference settings, the preference settings being indicative of the user's preference as to at least one of the subdivision of the information objects based on division criteria and determination of the relevance value.

The relevance value of the at least one data subdivision may be determined based on a temporal value indicative of the length of time that data subdivision has been in the second data storage device.

The relevance value of the at least one data subdivision may be determined based on speed of transfer between the first data storage device and the second data storage device.

The relevance value of the at least one data subdivision may be based on the size of the data subdivision.

In some embodiments, the first data storage device is located on a server computer and the second data storage device is located on a client computer, the server computer and client computer being operatively connected.

The first data storage device and the second data storage device may be located on a client computer. The first data storage device and the second data storage device may be logical partitions of a single data storage device.

In some embodiments, the information objects in the first data storage device are in a first format, and the data subdivisions in the second data storage device are in a second format. The information objects in the first data storage device may be compressed, and the data subdivisions in the second data storage device may not be compressed.

The division criteria may include the processing capabilities of the processor.

The division criteria may include the capabilities of software configured to run on the processor.

According to another aspect, there is provided a method for managing information objects in dynamic data storage devices comprising automatically dividing the plurality of information objects in the first data storage device using at least one processor to form at least one data subdivision based on division criteria, the processor being operatively coupled to the first data storage device and a second data storage device, the second data storage being connectable to an output device for providing at least some of the information objects to at least one user, repeatedly, in response to a dynamic operating condition using at least one processor to determine a relevance value of at least one of the data subdivisions in the first data storage device and the second data storage device indicative of the relevance of those data subdivisions to the user, and based on the relevance value, perform at least one of loading those data subdivisions to the second data storage, or unloading those data subdivisions from the second data storage.

DRAWINGS

For a better understanding of the embodiments described herein and to show more clearly how they may be carried into effect, reference will now be made, by way of example only, to the accompanying drawings which show at least one exemplary embodiment, and in which:

FIGS. 4A to 4B are schematic diagrams illustrating the information objects being displayed in the output device in FIG. 1;

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein.

Furthermore, this description is not to be considered as limiting the scope of the embodiments described herein in any way, but rather as merely describing the implementation of the various embodiments described herein.

In some cases, the embodiments of the systems and methods described herein may be implemented in hardware or software, or a combination of both. However, in some cases, these embodiments are implemented in computer programs executing on programmable computing device each comprising at least one processor, a data storage device (including volatile and non-volatile memory and/or storage elements), at least one input device, and at least one output device.

For example and without limitation, the computing device may be a mainframe computer, a server, a personal computer, a laptop, a personal data assistant, a tablet computer, a smartphone, or a cellular telephone. Program code may be applied to input data to perform the functions described herein and generate output information. The output information may be applied to one or more output devices, in known fashion.

Each program may be implemented in a high level procedural or object oriented programming and/or scripting language to communicate with a computer system. However, the programs can be implemented in assembly or machine language, if desired. In any case, the language may be a compiled or interpreted language. Each such program may be stored on a non-transitory storage media or a device (e.g. ROM or magnetic diskette) readable by a general or special purpose programmable computer, for configuring and operating the computer when the storage media or device is read by the computer to perform the procedures described herein.

The systems and methods as described herein may also be considered to be implemented as a non-transitory computer-readable storage medium, configured with a computer program, where the storage medium so configured causes a computer to operate in a specific and predefined manner to perform at least some of the functions described herein.

Figure 1:
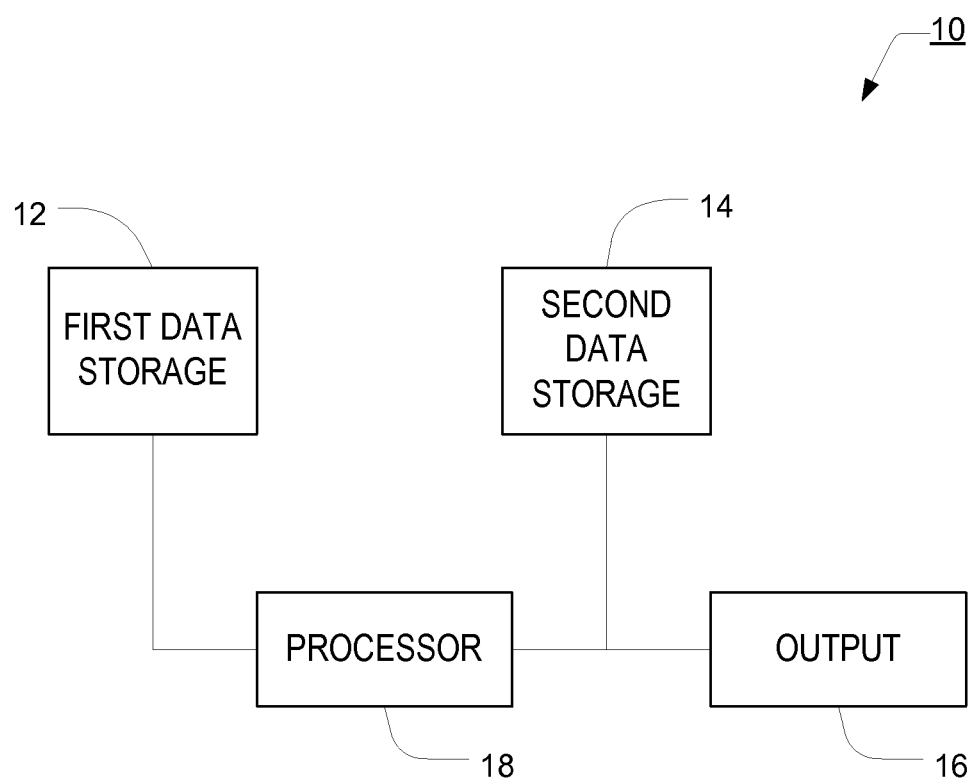
FIG. 1 is a block diagram illustrating a system for managing information objects in dynamic data storage devices according to one embodiment.

Referring to FIG. 1, illustrated therein is a system 10 in an exemplary embodiment for managing information objects in dynamic data storage devices. The system 10 comprises a first data storage device 12 and a second data storage device 14. Each of the data storage devices 12 and 14 may include volatile or non-volatile computer memory such as RAM, flash memory, video memory and magnetic computer storage devices.

In some embodiments, the type of memory for first data storage device 12 and the second data storage device 14 may differ. For example, the first data storage device 12 may include a slower hard disk drive (e.g. a persistent data storage device) while the second data storage device 14 may include a faster RAM (e.g. a dynamic data storage device).

In another example, the first data storage device 12 may be RAM and the second data storage 14 may be video RAM.

In other embodiments, the type of memory for the data storage devices 12 and 14 may be the same.

In other embodiments, a single memory unit using logical partitions may implement both the data storage devices 12 and 14.

The data storage devices 12 and 14 also have a memory size value indicative of the amount of memory available for use. This value is generally lower than the total memory capacity since other processes running on the computing device normally use at least some of the memory.

Figure 2A:
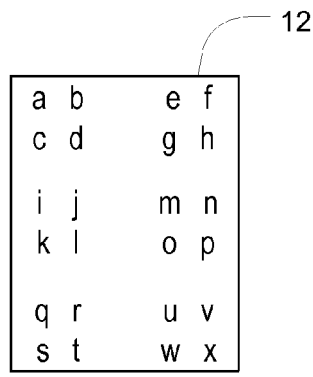
FIGS. 2A to 2C are schematic diagrams illustrating the information objects in the first data storage device in FIG. 1.

As shown in FIG. 2a, the first data storage device 12 may contain a plurality of information objects "a"-"x" associated with an application. Each information object "a"-"x" may represent content data such as content on a web page. In various embodiments, information objects may represent content data such as folder and file structures, metadata taxonomy classifications, ePortfolio (electronic portfolio) artifacts, presentation objects, quiz questions, learning objects, search results, activity log items, RSS feed items, analytics reports and data items, emails, pages, instant messages, categorized data, and other objects in electronic learning systems.

As shown, the system 10 also has an output device 16 operatively connected to the second data storage device 14. The output device 16 may be a display device or any other device that is capable of conveying information to a human user. For example, the output device may be a liquid crystal display (LCD), an OLED, and so on.

If the output device 16 is a display device, there may be an associated physical size value of the screen (e.g. 21 inches diagonal with a 16:9 aspect ratio) and a resolution value indicative of the number of pixels that display is configured to display.

The resolution value and the size value may indicate the amount of information objects that may be displayed at the screen at a single time. The output device 16 may be operatively connected to the second data storage 14 as known to one skilled in the art.

The system 10 also has at least one processor 18 operatively connected to the data storage devices 12 and 14. In the embodiment as shown, the system 10 has only one processor. In other embodiments, the system 10 may have more than one processor. The at least one processor 18 is operatively connected to the data storage devices 12 and 14 as known to one skilled in the art. In some embodiments, the two or more processors 18 may be configured to operate at least partially in parallel. In other embodiments, two or more processors may be configured to operate sequentially in stages.

The processor 18 may transfer data between the first data storage device 12 and the second data storage device 14. There will generally be a rate of transfer value indicative of the speed of transfer between the first data storage device 12 and the second data storage device 14. The speed of transfer may vary depending on the configuration of the system 10 in various embodiments. For example, if the data storage devices 12 and 14 are located on a same computer and connected by an internal bus, the rate of the transfer will tend to be much faster than if the data storage devices 12 and 14 are located on different computers and connected through a communication network.

In the latter case, the speed of transfer between the data storage devices 12 and 14 may also be highly dependent on the speed of the communication network. For example, if the data storage devices 12 and 14 are connected through an IEEE 802.11 "WiFi" network (e.g. a 802.11g or 802.11n network), the speed of transfer would likely be faster than if the data storage device 12 and 14 were connected by a cellular 3G network.

Figure 2B:
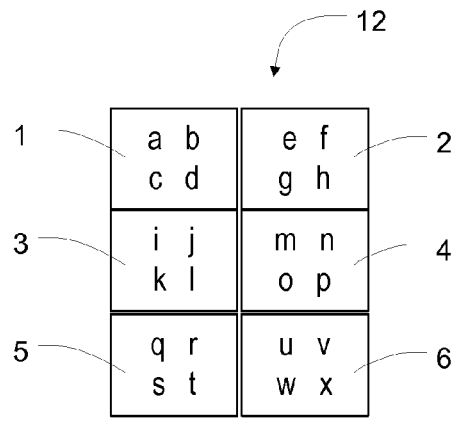
Figure 2C:
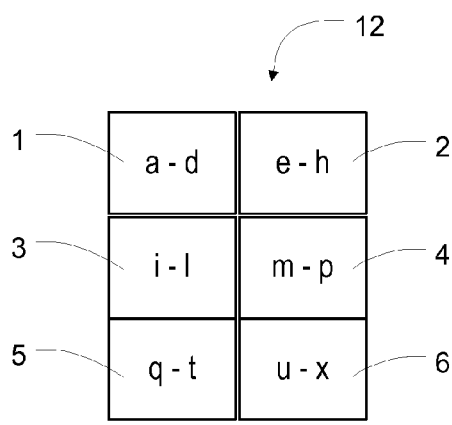

The processor 18 is configured to automatically divide the plurality of information objects "a"-"x" to form at least one data subdivision based on division criteria. Referring to FIG. 2b, illustrated therein is an exemplary division of the plurality of information objects "a"-"x" contained in the first data storage device 12 into data subdivisions 1-6.

Each data subdivision may comprise a subset of the plurality of information objects. In the embodiment as shown in FIG. 2b, the subdivision 1 comprises information objects "a"-"d".

In another embodiment, the data subdivision may comprise metadata associated with the information objects within the data subdivision. For example, as shown in FIG. 2b, the data subdivision 1 includes metadata labeled "a-d", which indicates that this data subdivision is associated with the information objects "a", "b", "c" and "d".

Using metadata to represent data subdivisions may be performed in cases where there is a large number information objects in each data subdivision. It may also be performed in cases where the size of the contents of each data subdivision is large. In general, using metadata to represent the contents of the data subdivision may be used when it is undesirable to transfer the contents into the second memory unless it is necessary to do so.

The division criteria may include the memory size value indicative of available memory size for the second data storage device 14. For example, it will normally not be efficient to subdivide the information objects into data subdivisions when each of which is larger than the available memory size of the second data storage device.

It may also generally be desirable to divide the information objects into data subdivisions sized much less than the available size to provide flexibility such that multiple data subdivisions may be loaded into the second data storage device 14.

The division criteria may also include the speed of transfer between the first data storage device 12 and the second data storage device 14. In cases where the transfer speed is relatively low, it may be desirable to have more data subdivisions with the size of each data subdivision being relatively small.

This tends to permit a more selective transmission of the data. Similarly, in situations where the cost of transmission is relatively expensive, it may be preferable to have more data subdivisions with the size of each subdivision being relatively small.

The division criteria may also include characteristics of the output device connected to the second data storage device 14. For example, if the amount of information that can be displayed on a display screen is relatively limited, it may be desirable to have smaller data subdivisions.

The division criteria may also include preference settings provided by a user. For example, the user may wish to have a smaller number of large data subdivisions, or a larger number data subdivisions based on personal preference. The user may also prefer to have the data subdivisions include metadata instead of information objects.

Figure 3:
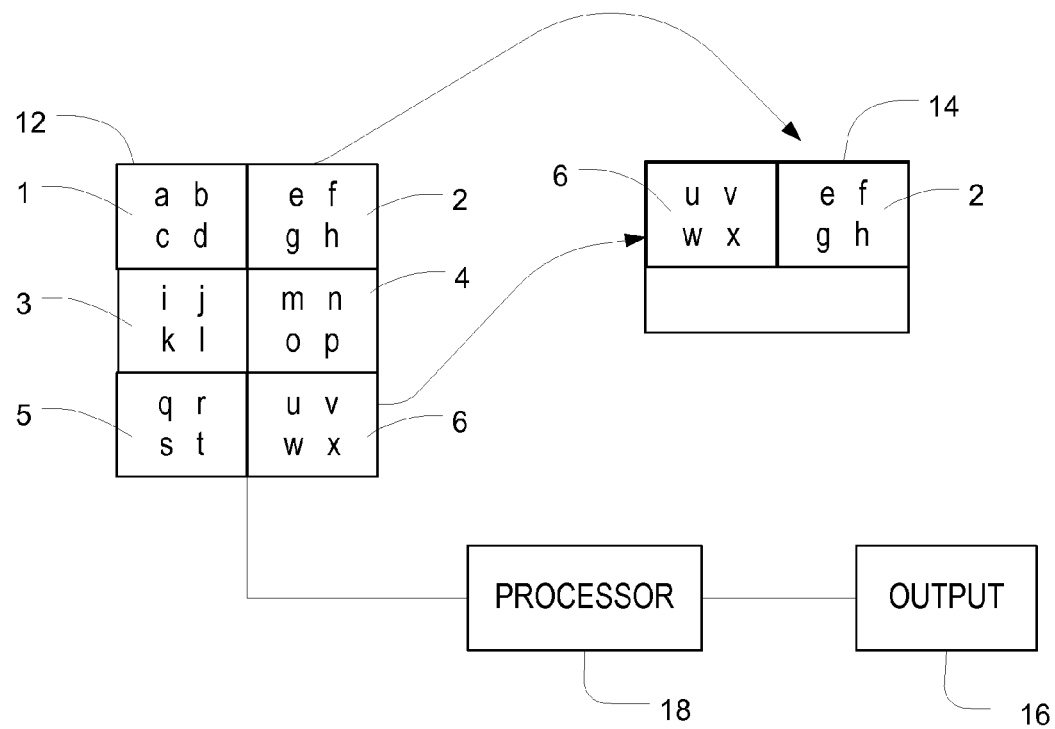
FIG. 3 is a schematic diagram illustrating the information objects in the first data storage device and the second data storage device in FIG. 1.

The processor 18 may be further configured to repeatedly (in response to dynamic operating conditions) determine a relevance value of at least one of the data subdivisions in the first data storage device 12 and the second data storage device 14 indicative of the relevance of those data subdivision to the user and based on the relevance value, either loading those data subdivision to the second data storage device 14, or unloading those data subdivision from the second data storage device 14. For example, as shown in FIG. 3, subdivisions 2 and 6 are currently loaded in the second data storage 14.

Dynamic operating conditions include various factors that may prompt the processor to determine the relevance value of the data subdivisions. For example, the dynamic operating condition may include user interaction with the information objects that are currently displayed or requested. For example, if a user requests an information object, it may prompt the processor to determine the relevance value of that information objects and perhaps additional information objects.

In another example, the dynamic operating condition may be a time factor such that the processor is prompted to re-determine the relevance value of the data subdivisions periodically.

In yet another example, the dynamic operating condition may include a change in the system such as a change in the value of available memory size of the second data storage device 14.

In some embodiments, the processor 18 may be configured to re-divide the plurality of information objects in the first data storage in response to a dynamic operating condition.

The relevance value of each of the data subdivisions in the data storage devices 12 and 14 may reflect the favorability of loading or unloading respective data subdivisions from the data storage devices 12 and 14. For example, the system may load data subdivisions that are above a relevance threshold and unload data subdivisions that are under a relevance threshold.

The relevance value is indicative of the relevance of those data subdivisions to the user of the system. By having relevant data subdivisions in the second data storage device 14, the system 10 may improve the performance of the system.

In some embodiments, the relevance value of each data subdivision may be determined based on the amount of user interaction with that data subdivision and/or the system.

In some embodiments, the value of each data subdivision may be determined based on the type of user interaction with that data subdivision and/or the system.

In some embodiments, the value of each subdivision may be determined based on the method by which a user interacts with that data subdivision and/or the system.

In some embodiments, the value of each data subdivision may be determined based on the behavioral characteristics of the user interaction with that data subdivision and/or the system.

Referring now to FIGS. 4*a* and 4*b*, illustrated therein is a scenario wherein a user is interested in tab 2 and tab 6 and is flipping back and forth between the tabs 2, 6. In FIG. 4*a*, the output device 16 is showing tab 2, and in FIG. 4*b*, the output device 16 is showing tab 6. Each of the tab 2 and tab 6 is displaying information objects in subdivision 2 and subdivision 6 respectively. The user interaction with tabs 2 and 6 will increase the relevance value of the subdivision containing information objects being displayed in tabs 2 and 6.

In other words, as the user clicks on each tab to view the information objects contained therein, the relevance value of the data subdivision containing the information objects is increased. The increase in the relevance value will be above the threshold such that the data subdivisions 2 and 6 are kept loaded in the second data storage device 14.

Figure 5A:
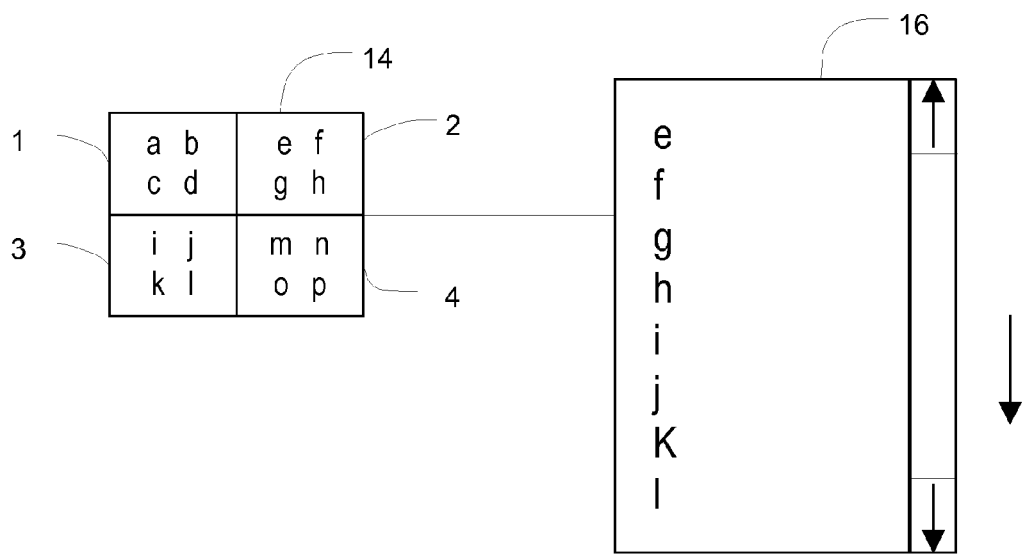
FIGS. 5A to 5B are schematic diagrams illustrating the information objects in the second data storage device and being displayed in the output device in FIG. 1.

Referring to FIG. 5*a*, data subdivisions 1-4 are in the second data storage device 14. The output device 16 is displaying information objects "e" to "l", which are in data subdivisions 3 and 4. The user may be scrolling or paging downwards as indicated. The user interaction with the data subdivision, in this case the act of scrolling downwards, suggests that the user may be interested in information objects contained in data subdivision 4-6 in the near future.

Figure 5B:
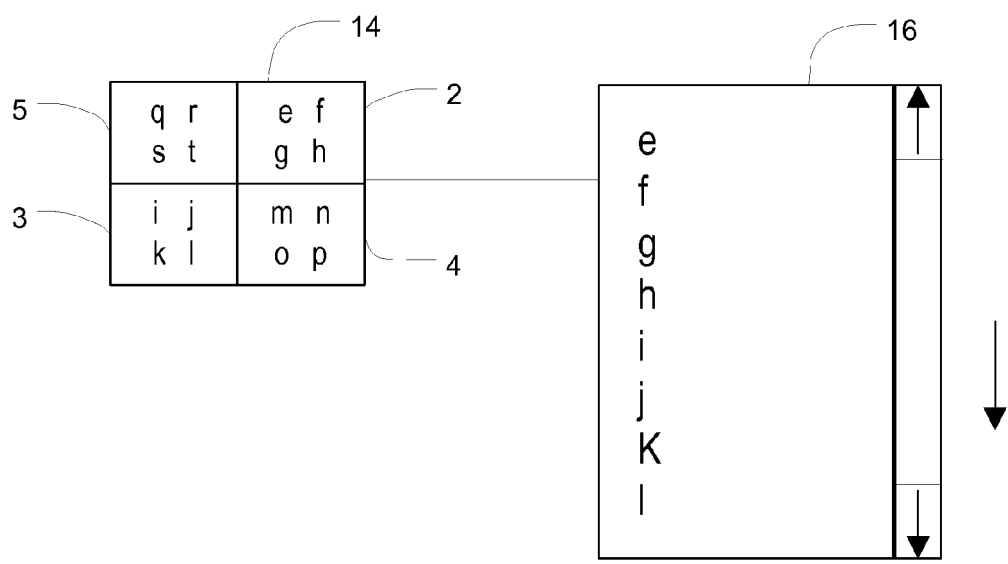

The relevance value of data subdivision 1 will be reduced based on this user interaction while relevance value of data subdivisions 4-6 being increased. Depending on relative values of specific relevance values, such amendments to the relevance values may cause data subdivision 1 to be unloaded from the second data storage device 14 and data subdivision 5 to be loaded into the second data storage 14 as shown in FIG. 5*b*.

The relevance value of each data subdivision may also be determined based on user preference settings or system settings. For example, a user may prefer to have all subdivisions loaded into the second data storage device 14. In such cases, the relevance value of all subdivisions may be modified such that all (or at least a substantial portion) of them are above the threshold to load into the second data storage device 14.

The relevance value of each subdivision may also be affected by a temporal value indicative of the length of time the data subdivision has been in the second data storage device 14. For example, the relevance value of each data subdivision will be decreased as time passes. The processor may unload data subdivisions that have been there for an extended period of time based on such a decrease in relevance values. However, if the data subdivision is requested or interacted upon by the user, the increase in relevance value due to user interaction will more than offset the decrease due to time value, thus keeping the data subdivision above the threshold and in the second data storage device 14.

The threshold to load or unload data subdivisions in accordance with their respective relevance values may also be modified based on user preference settings and/or system parameters. For example, if the rate of transmission between the first data storage device 12 and the second data storage 14 is relatively slow, the threshold may be lowered such that more data subdivisions are being loaded into the second data storage device 14. This may reduce wait time if the user request information objects from the subdivision that has been loaded because of the reduction in the threshold. If the user prefers to have all the information objects loaded into the second data storage device 14, the threshold might be floored such that all data subdivisions are loaded regardless of the relevance value.

In some embodiments, at least some processing and/or transmitting may occur in the background while one set of values is being displayed. For example, while a user is interacting with one set of data, additional sets of data could be loaded in the background. Alternatively, if only metadata was retrieved initially, then background processing could be using to grab an entire object associated with the metadata. In some embodiments, predictive pre-fetching of additional data could also be performed based on recent actions (e.g. actions taken by the user) or based on data that has been gathered about the user (or users in general) in order to create an improved (e.g. faster, more responsive, etc.) user experience.

In another example, the amount of available memory size in the second data storage device 14 may also affect the threshold. Generally, it may be possible to achieve the same effect as increasing or decreasing of the threshold by modifying the relevance values of all (or at least some of) the data subdivisions.

The relevance value may be calculated based on a number of factors. In some embodiments, a relevance value may be a numerical value.

Figure 6:
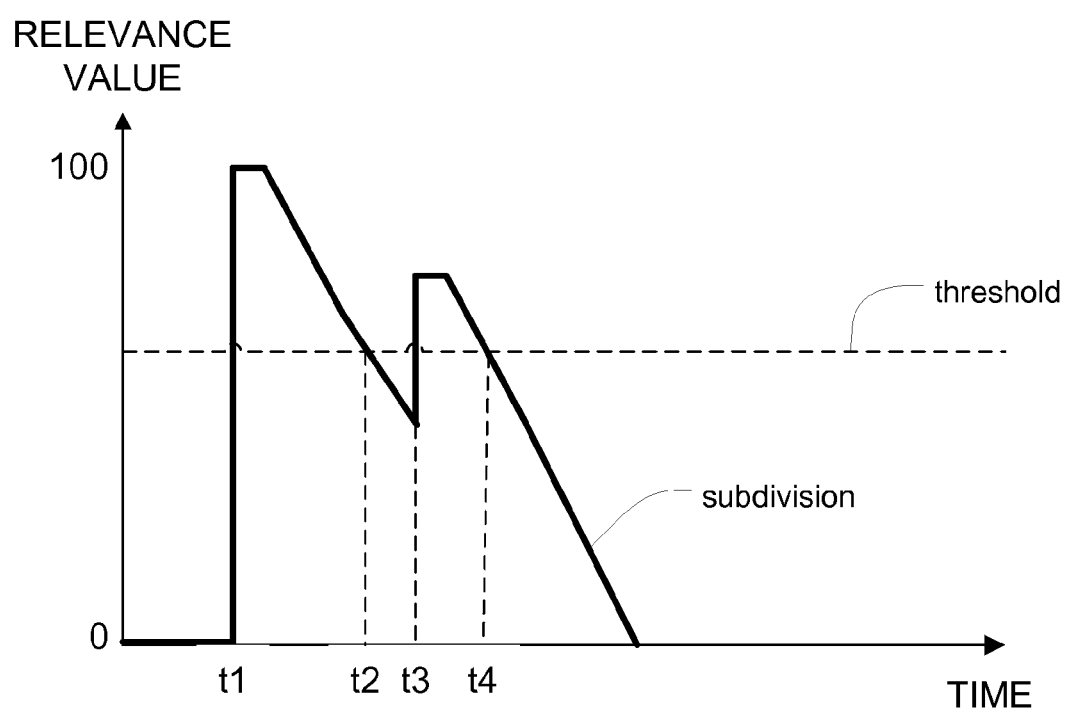
FIG. 6 is a graph representing changes the relevance value of an exemplary subdivision over time.

Referring to FIG. 6, illustrated therein is a graph of a relevance value of an exemplary data subdivision at different times. At time t1, the data subdivision was requested by the user, which increased the relevance value of the data subdivision to a maximum of 100. The relevance value then is decreased over time between times t1 and t2. At time t2, the relevance value fell below the threshold of 50 and therefore was unloaded from the second data storage device 14.

However, at time t3, the relevance value was increased, for example due to a user interaction event. Since the relevance value at time t3 is above the threshold, it is loaded to the second data storage device 14. The relevance value then decreases again over time, and at time t4, it was unloaded from the second data storage device 14.

Figure 7:
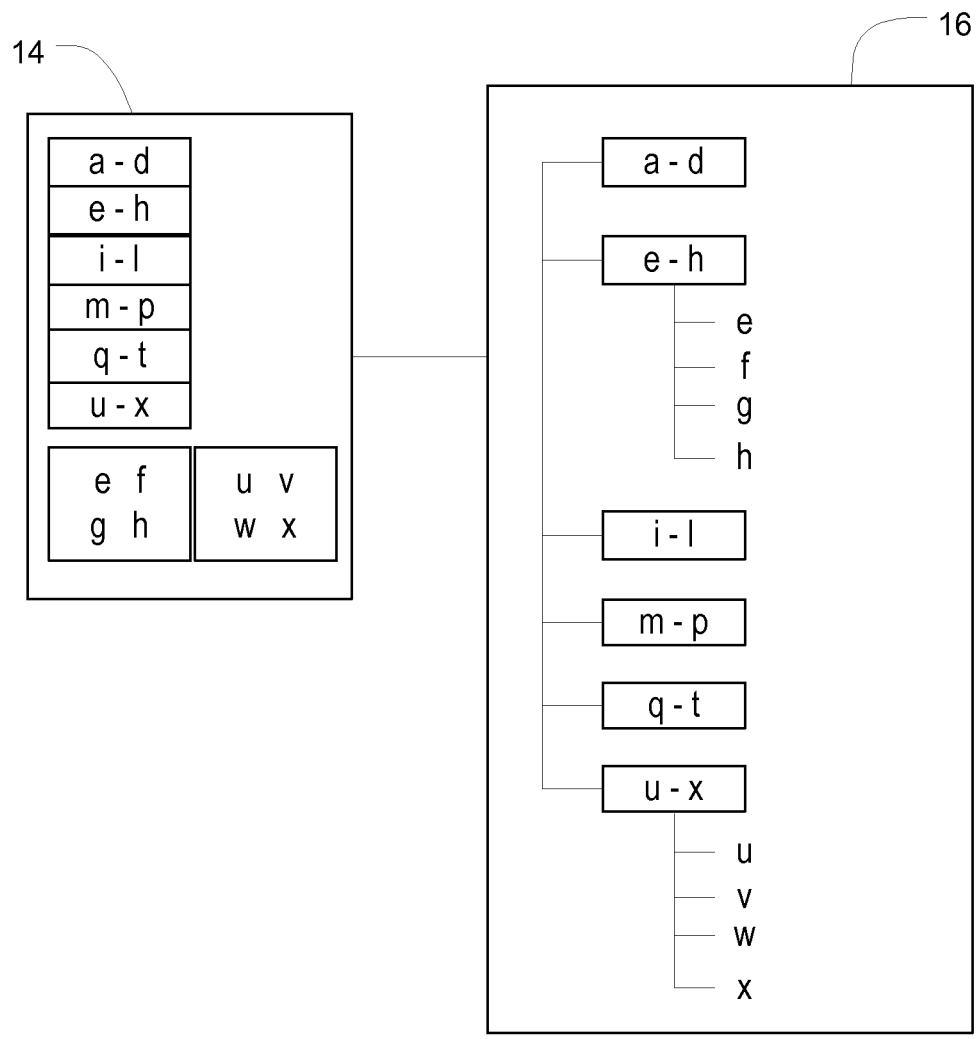
FIG. 7 is a schematic diagram representing the contents of the second memory storage device being displayed in the output device of FIG. 1.

Referring now to FIG. 7, illustrated therein is an exemplary display screen displaying a combination of metadata about data subdivisions and information objects in data subdivisions. As shown, metadata about information objects contained in a data subdivision are listed on the left side of the screen. Data subdivisions 2 and 6 are currently selected thus the information objects "e"-"h" and "u"-"x" are displayed. In the second data storage device 14, metadata relating to all subdivisions 1-6 and information objects relating to subdivision 2 and 6 are loaded.

Whether information objects associated with a data subdivision are loaded may be determined by the relevance value of the subdivision. In this case, because the user has interacted with the subdivisions 2 and 6 to view the objects, the relevance value of these data subdivisions has been increased, such that information objects associated with the data subdivisions are loaded. If another subdivision is selected and expended, the relevance value of the other data subdivision will be increased such that the information objects associated with that data subdivision is loaded.

If a data subdivision that has been previous loaded is minimized, the user action of minimizing may reduce the relevance value of the data subdivision. As stated above, the temporal factor will also reduce the relevance value of the data subdivisions in the second data storage device 14. If the relevance value of the data subdivision is reduced to below a certain threshold, the data subdivision will be unloaded from the second data storage device 14.

Figure 8:
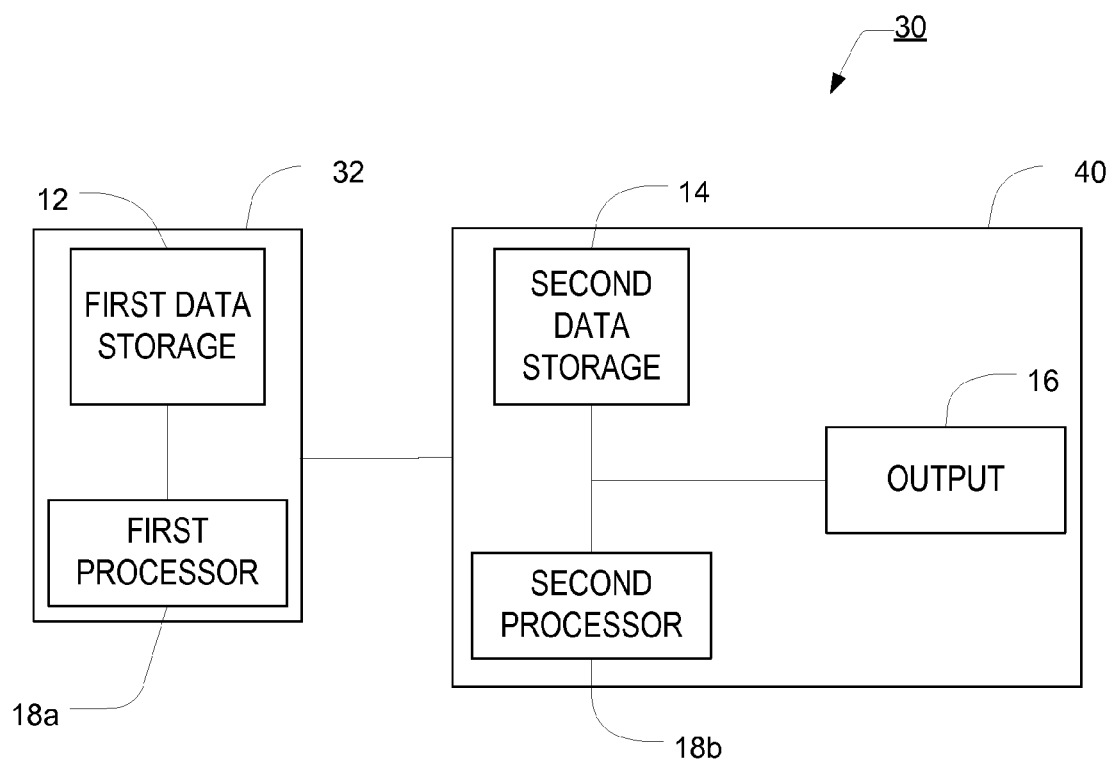
FIG. 8 is a block diagram illustrating a system for managing information objects in dynamic data storage devices according to another embodiment.

Referring now to FIG. 8, illustrated therein is a system 30 according to another embodiment. The system 30 is similar in some aspects to the system 10, and like elements are indicated by like numerals. The system 30 comprises a server computer 32 and a client computer 40. The server computer 32 has a first data storage device 12 and a first processor 18a operatively connected to the first processor 18a. The client computer 40 has a second data storage device 14, which is operatively connected to a second processor 18b and an output device 16. The server computer 32 and the client computer 40 are operatively connected to each other such that information objects stored in the first data storage device 12 may be transferred to the second data storage device 14.

The first processor 18a is configured to automatically divide the plurality of information objects in the first data storage device to form at least one data subdivision based on division criteria (similar to the processor 18 in system 10).

The second processor 18b is configured to repeatedly (in response to a dynamic operating condition) determine a relevance value of at least one of the data subdivisions in the first data storage device and the second data storage device indicative of the relevance of those data subdivision to the user, and based on the relevance value, perform at least one of (i) loading those data subdivision to the second data storage 14, and (ii) unloading those data subdivision from the second data storage 14. This is similar to the processor 18 in system 10.

Figure 9:
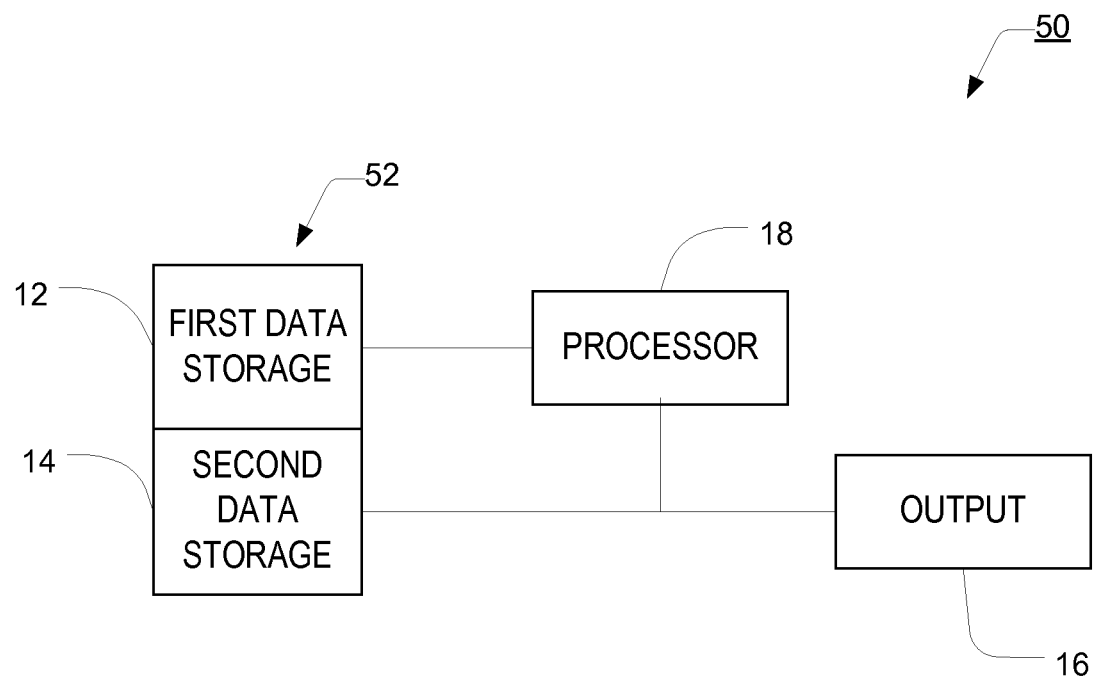
FIG. 9 is a block diagram illustrating a system for managing information objects in dynamic data storage devices according to yet another embodiment.

Referring now to FIG. 9, illustrated therein is a system 50 according to another embodiment. The system 50 is similar to the system 10 in some aspects, and like elements are indicated by like numbers.

The system 50 includes one or more general data storage devices 52, which has been logically partitioned into a first data storage device 12 and a second data storage device 14. The system 50 also include a processor 18 and an output device 16 operatively connected to the processor 18 and the second data storage device 14.

The general data storage device 52 may be any type of computer memory. As shown the data storage device has been partitioned to form the first data storage device 12 and the second data storage device 14. This may be a physical partition or a logical partition. For example, the information objects located in the first data storage device 12 may be compressed such that it is not possible for an application to access the information objects without uncompressing, which may be done as the subdivisions are transferred to the second data storage device 14. In another example, the information objects located in the first data storage device 12 may not be in an appropriate format such that it is not possible for an application to access the information objects without preformatting, which may be done as subdivisions are transferred to the second data storage device 14.

In some embodiments, the system for managing information objects in dynamic data storage devices may be performed by a computing device running an Internet browser application. The web pages that the browser displays may include instructions to program the processor for managing information objects in dynamic data storage devices as described above using Java Scripting language.

In some embodiments, potential implementations could include a flash application, a silverlight application, through a video player with "ffw/rev", "next/prev" and chapter selection as input options, client-server applications (which could be implements on a computer, gaming system, mobile device, and so on), or as a game where options within the game are loaded on demand.

Figure 10:
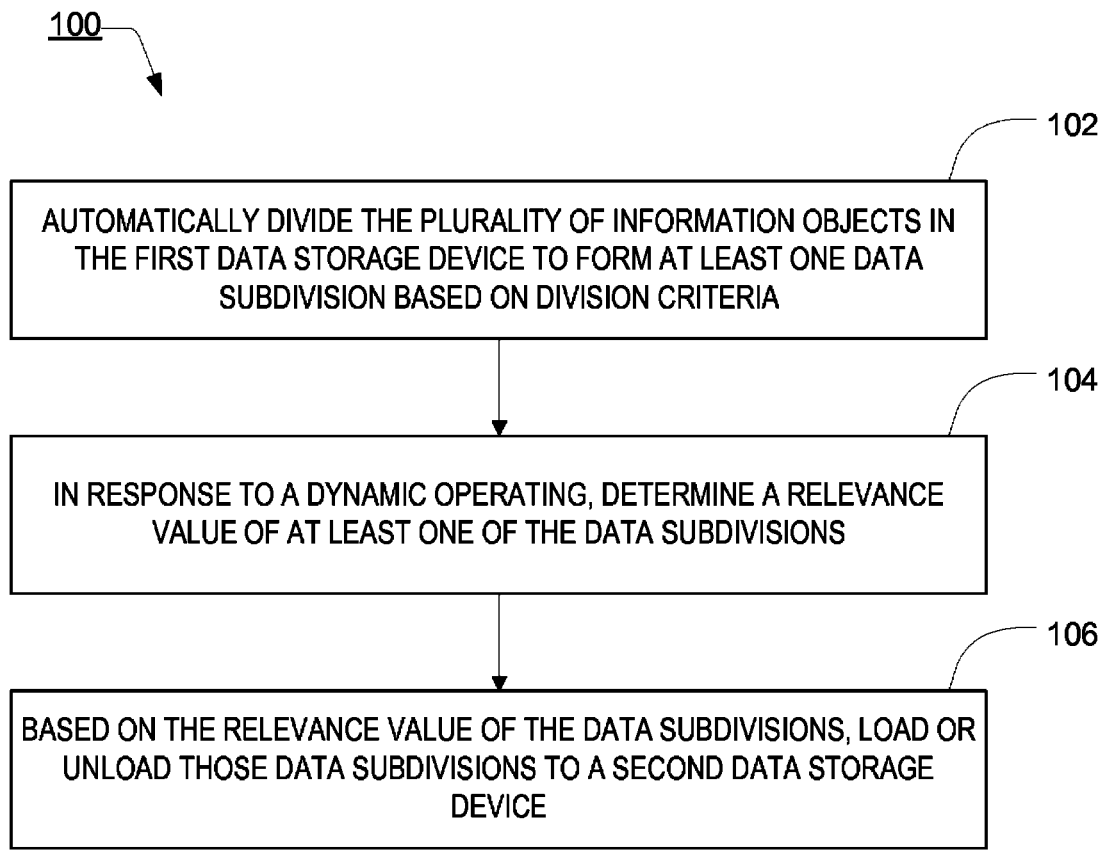
FIG. 10 is a block diagram illustrating steps of a method for managing information objects in dynamic data storage devices according to yet another embodiment.

Referring now to FIG. 10, illustrated therein is a method 100 for managing information objects in dynamic data storage devices according to another embodiment. The method may be employed in a system such as the systems 10, 30, and/or 50 as described herein.

The method 100 starts at step 102 wherein the method automatically divide the plurality of information objects in a first data storage device using at least one processor to form at least one data subdivision based on division criteria. The at least one processor is operatively coupled to the first data storage device and a second data storage device, and the second data storage is connectable to an output device for providing at least some of the information objects to at least one user. The division criteria may be similar to the division criteria as described herein above.

The method 100 then proceeds to step 104, wherein the method 100, in response to a dynamic operating condition, uses at least one processor to determine a relevance value of at least one of the data subdivisions in the first data storage device and the second data storage device. The relevance values of the data subdivisions are indicative of the relevance of those data subdivisions to the user. The dynamic operating condition and the relevance values may be similar to the dynamic operating condition and the relevance value as described herein above.

The method 100 then proceeds to step 106, wherein the method 100, based on the relevance values of the data subdivisions, performs at least one of loading those data subdivisions to the second data storage, or unloading those data subdivisions from the second data storage.

While the steps of the above methods have been described sequentially hereinabove, it should be noted that sequential performance of the steps may not need to occur for successful implementation of the method. As will be evident to one skilled in the art, rearranging sequence of performance of the steps, omitting the performance of some steps, or performing the steps in parallel may be possible without abandoning the essence of the invention.

While certain features have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system for managing information objects in dynamic data storage devices comprising:
   a) a first data storage device having a plurality of information objects;
   b) a second data storage device operatively connected to an output device for providing at least some of the information objects to at least one user; and
   c) at least one processor operatively coupled to the first data storage device and the second data storage device, the at least one processor configured to:
      i) automatically divide the plurality of information objects in the first data storage device to form at least one data subdivision based on division criteria;
      ii) determine, based on a dynamic operating condition, a relevance value of the at least one of the data subdivisions in the first data storage device and the second data storage device indicative of the relevance of those data subdivisions to the user; and
      iii) repeatedly, in response to the dynamic operating condition:
         (1) re-determine the relevance value of the at least one of the data subdivisions in the first data storage device and the second data storage device indicative of the updated relevance of those data subdivisions to the user;
         (2) compare the relevance value of the at least one of the data subdivisions to a threshold, wherein the threshold is based at least in part on a speed of transfer between the first data storage device and the second data storage device; and
         (3) based on results of comparing the relevance value to the threshold, perform at least one of loading those data subdivisions to the second data storage device, or unloading those data subdivisions from the second data storage device.

2. The system of claim 1, wherein the at least one processor is further configured to load the at least one of the data subdivisions to the second data storage device in the event that the relevance value associated with those data subdivisions is outside the threshold.

3. The system of claim 1, wherein the at least one processor is further configured to unload the at least one of the data subdivisions from the second data storage device in the event that the relevance value associated with those data subdivisions is outside the threshold.

4. The system of claim 1, wherein the at least one processor is further configured to re-divide the plurality of information objects in response to the dynamic operating condition.

5. The system of claim 1, wherein each data subdivision comprises at least one of a subset of the plurality of information objects, and subdivision metadata associated with the data subdivision indicative of the at least one of a subset of the plurality of information objects associated with the subdivision.

6. The system of claim 5, wherein whether each data subdivision comprises the metadata associated with at least one of the plurality of information objects, or whether each data subdivision comprises the plurality of information objects is determined based on the quantity of information objects to be displayed.

7. The system of claim 5, wherein when the data subdivision comprises metadata, the at least one of the plurality information objects associated with that data subdivision is loaded to the second data storage device based on the relevance value of that data subdivision.

8. The system of claim 5, wherein when the data subdivision comprises metadata, the at least one of the plurality information objects associated with that data subdivision is unloaded from the second data storage device based on the relevance value of that data subdivision.

9. The system of claim 1, wherein the division criteria includes a memory size value indicative of available memory size for the second data storage device, wherein the memory size value is dynamic.

10. The system of claim 1, wherein when the output device is a display device, the division criteria include a display size value indicative of the size of the output display.

11. The system of claim 1, wherein the division criteria includes the size of the at least one data subdivision.

12. The system of claim 1, wherein the division criteria include the speed of transfer between the first data storage device and the second data device.

13. The system of claim 1, wherein the division criteria include preference settings, the preference settings being indicative of the user's preference as to at least one of the data subdivisions of the information objects based on the division criteria and the determination of the relevance value.

14. The system of claim 1, wherein the relevance value of the at least one data subdivision is determined based on an interaction frequency value indicative of the frequency of user interaction with that data subdivision.

15. The system of claim 14 wherein the first data storage device and the second data storage device are logical partitions of a single data storage device.

16. The system of claim 14, wherein the information objects in the first data storage device are in a first format, and the data subdivisions in the second data storage device are in a second format.

17. The system of claim 14, wherein the information objects in the first data storage device are compressed, and the data subdivisions in the second data storage device are not compressed.

18. The system of claim 1, wherein the relevance value of the at least one data subdivision is determined based on preference settings, the preference settings being indicative of the user's preference as to at least one of the subdivision of the information objects based on division criteria and the determination of the relevance value.

19. The system of claim 1, wherein the relevance value of the at least one data subdivision is determined based on a temporal value indicative of the length of time that the data subdivision has been in the second data storage device.

20. The system of claim 1, wherein the relevance value of the at least one data subdivision is based on the size of the data subdivision.

21. The system of claim 1 wherein the first data storage device is located on a server computer and the second data storage device is located on a client computer, the server computer and client computer being operatively connected.

22. The system of claim 1 wherein the first data storage device and the second data storage device are located on a client computer.

23. The system of claim 1, wherein the division criteria include the processing capabilities of the processor.

24. The system of claim 1, wherein the division criteria include the capabilities of software configured to run on the processor that is to interpret the data.

25. The system of claim 1, wherein the division criteria includes user preference setting provided by a user.

26. A method for managing information objects in dynamic data storage devices comprising:

automatically dividing a plurality of information objects in a first data storage device using at least one processor to form at least one data subdivision based on division criteria, the processor being operatively coupled to the first data storage device and a second data storage device, the second data storage being connected to an output device for providing at least some of the information objects to at least one user;

using the at least one processor to determine, based on a dynamic operating condition, a relevance value of the at least one of the data subdivisions in the first data storage device and the second data storage device indicative of the relevance of those data subdivisions to the user repeatedly, in response to the dynamic operating condition using the at least one processor to:

re-determine the relevance value of at least one of the data subdivisions in the first data storage device and the second data storage device indicative of the updated relevance of those data subdivisions to the user;

compare the relevance value of the at least one of the data subdivisions to a threshold, wherein the threshold is based at least in part on a speed of transfer between the first data storage device and the second data storage device; and based on results of comparing the relevance value to the threshold, perform at least one of loading those data subdivisions to the second data storage device, or unloading those data subdivisions from the second data storage device.

* * * * *